US007205711B2

United States Patent
Hamada et al.

(10) Patent No.: US 7,205,711 B2
(45) Date of Patent: Apr. 17, 2007

(54) FLUORESCENT DISPLAY DEVICE AND PHOSPHOR PASTE

(75) Inventors: Takuya Hamada, Chiba (JP); Masahiro Kato, Chiba (JP); Tomohiro Yamada, Chiba (JP); Kazunori Kitagawa, Chiba (JP); Hitoshi Toki, Chiba (JP)

(73) Assignee: Futaba Corporation, Chiba (JP)

( * ) Notice: Subject to any disclaimer, the term of this patent is extended or adjusted under 35 U.S.C. 154(b) by 236 days.

(21) Appl. No.: 10/671,626

(22) Filed: Sep. 29, 2003

(65) Prior Publication Data

US 2004/0100181 A1    May 27, 2004

(30) Foreign Application Priority Data

Sep. 30, 2002  (JP)  ............................. 2002-284954
Sep. 16, 2003  (JP)  ............................. 2003-322483

(51) Int. Cl.
*H01J 1/62*   (2006.01)
*H01J 63/04*  (2006.01)

(52) U.S. Cl. .................. 313/486; 313/485; 313/487; 313/489; 252/301.4 R; 252/301.6 R

(58) Field of Classification Search ................ 313/496
See application file for complete search history.

(56) References Cited

U.S. PATENT DOCUMENTS 4,275,333 A * 6/1981 Kagami et al. ............. 313/495

4,468,589 A * 8/1984 Hikida et al. ................ 313/496
6,416,688 B1 * 7/2002 Yu et al. ................ 252/301.6 R
6,690,119 B2 * 2/2004 Hamada et al. ............. 313/496

FOREIGN PATENT DOCUMENTS

| CN | 1062917   | 7/1992 |
| JP | 55/86872  | 7/1980 |
| JP | 63-61082  | 3/1988 |
| JP | 1-182390  | 7/1989 |
| JP | 4-106848  | 4/1992 |
| JP | 11-172240 | 6/1999 |

* cited by examiner

*Primary Examiner*—Mariceli Santiago
(74) *Attorney, Agent, or Firm*—Bacon & Thomas, PLLC

(57) ABSTRACT

In a fluorescent display device wherein light is emitted by impinging a low speed electron beam on a phosphor layer formed on an anode, the phosphor layer comprises a compound containing W and/or a compound containing P, K and/or Na. The compound containing P, K and/or Na may be a compound selected from the group consisting of $K_3PO_4$, $P_2O_5$ and $Na_2SiO_3$, the compound being added in an amount of 0.01 to 10.00 wt % to the phosphor layer, to provide a higher luminance residual ratio and a higher high temperature exposure characteristic than those of a convention fluorescent display device.

4 Claims, 3 Drawing Sheets

FLUORESCENT DISPLAY DEVICE AND PHOSPHOR PASTE

FIELD OF THE INVENTION

The present invention relates to a fluorescent display device; and, more particularly, to a fluorescent display device including a phosphor layer which has a stable luminescence property.

BACKGROUND OF THE INVENTION

FIG. 3 shows a cross sectional view of an exemplary conventional fluorescent display device 10. The fluorescent display device 10 includes a glass back plate 11, an anode substrate 12 having an anode conductor 16 formed on the anode substrate 12 and a phosphor layer 17 deposited on the anode conductor 16, and filaments 131 and 132 installed under the phosphor layer 17.

In the conventional fluorescent display device 10, light is emitted from the phosphor layer 17 by impinging thereon a low speed electron beam. In this case, the low speed electron beam can reach only a few angstroms from a surface of the phosphor layer 17. Therefore, the surface condition of the phosphor layer 17 has a great impact on the luminescence property of the fluorescent display device 10.

A typical process of fabricating a fluorescent display device includes the steps of: calcining an anode substrate, on which an anode conductor having thereon a phosphor layer is arranged, at a temperature ranging from 350° C. to 550° C.; sealing up the fluorescent display device with an envelope at a temperature ranging from 450° C. to 550° C.; and evacuating the interior of the fluorescent display device to a high vacuum at a temperature ranging from 300° C. to 400° C.

In each of the steps preceding the step of evacuating the display device to a vacuum, since the surface of a phosphor layer is vulnerable to damage due to various environmental factors, the surface may be easily contaminated and deteriorated in its quality. Further, there is a problem that the luminescence property of the display device may become unstable when exposed to even a very small amount of moisture and/or residual gas remaining in the device.

For instance, the phosphor used in the fluorescent display device may be an oxide phosphor such as ZnO:Zn, sulfide or oxysulfide phosphor such as ZnS:Cu,Al. Such sulfide or oxysulfide phosphor can be affected by a very small amount of moisture or residual gas remaining in the fluorescent display device even at a high vacuum, such that the luminescence property of the display device may be deteriorated.

Among the above-described phosphors, with regard to a (Zn,Mg)O system phosphor of yellow luminous color, there has been disclosed a method for providing a fluorescent display device having a high luminance and a long life span by adding $WO_3$ in an amount of 0.05 to 20.00 wt % to the phosphor to thereby remove the residual gas remaining on the surface of the phosphor.

Further, for a (Zn,Mg)O system phosphor mixed with $ZnGa_2O_4$ of yellow luminous color, there has been disclosed a method for providing a fluorescent display device which emits a white light and has a long life span without using a pollution material such as cadmium (Cd).

However, a fluorescent display device employing the (Zn,Mg)O system phosphor of yellow luminous color has a deficiency in that the luminance of the display device may be diminished if the device is left unused or unlighted for more than a month.

In order to solve such a problem, it has been proposed to add $WO_3$ having a particle size of 0.2 to 0.34 μm in an amount of 0.01 to 10.00 wt % to the (Zn,Mg)O system phosphor of yellow luminous color, which has a particle size of 4 μm. The phosphor mixed with $WO_3$ may be used as a phosphor paste in a fluorescent display device.

Table 1 shows a high temperature exposure characteristic and a luminance residual ratio of such a fluorescent display device after an operation time of 1,000 hours at room temperature.

Herein, the luminance residual ratio of a display device means the ratio of a residual luminance after an operation time of 1,000 hours at a constant operational condition over an initial luminance of the display device. The luminance residual ratio is required to be more than or equal to 70%.

In general, the luminance residual ratio of 70% is equivalent to the luminance of the display device after an operation time of 10,000 hours, which is about 50% of the initial luminance.

Further, the high temperature exposure characteristic means the ratio of a luminance of the display device to the initial luminance after an exposure of the display device in an atmosphere of 85° C. for 72 hours. It is preferable that the high temperature exposure characteristic be more than or equal to 80%.

The high temperature exposure characteristic of more than or equal to 80% means that, after the display device is left unlighted at room temperature for a month, the ratio of a luminance of the display device to the initial luminance is 80%.

TABLE 1

| | $WO_3$ | |
| --- | --- | --- |
| Amount added (wt %) | Luminance residual ratio | High temperature exposure characteristic |
| 0.01 | 82% | 63% |
| 0.05 | 78% | 65% |
| 0.1 | 75% | 70% |
| 0.4 | 70% | 72% |
| 1 | 62% | 75% |
| 2 | 52% | 76% |
| 5 | 43% | 78% |
| 10 | 20% | 79% |

Although not shown in Table 1, when $WO_3$ was added in the amount of 0.10 wt % to the phosphor, the luminance of the fluorescent display device was 200 $cd/m^2$.

Referring to Table 1, the luminance residual ratio is in an inverse proportion to the high temperature exposure characteristic as the amount of $WO_3$ added varies. That is, while the luminance residual ratio is improved as the amount of $WO_3$ added decreases, the high temperature exposure characteristic is improved as the amount of $WO_3$ added increases.

Therefore, there is a need to provide a fluorescent display device having both a sufficient level of luminance residual ratio and a desirable degree of high temperature exposure characteristic.

SUMMARY OF THE INVENTION

It is, therefore, a primary object of the present invention to provide a fluorescent display device having both an improved luminance residual ratio and a satisfactory high temperature exposure characteristic in comparison with a conventional fluorescent display device.

In particular, it is an object of the present invention to provide a fluorescent display device employing a (Zn,Mg)O system phosphor of yellow luminous color, which has a luminance residual ratio of more than or equal to 70% and a high temperature exposure characteristic of more than or equal to 80%.

Further, it is another object of the present invention to improve a luminance residual ratio and a high temperature exposure characteristic of a fluorescent display device employing an oxide phosphor such as ZnO:Zn, a sulfide or oxysulfide phosphor such as ZnS:Cu,Al and other low speed electron beam phosphors.

In accordance with a preferred embodiment of the present invention, there is provided a fluorescent display device wherein light is emitted by impinging a low speed electron beam on a phosphor layer formed on an anode, wherein the phosphor layer comprises a compound containing P, K and/or Na.

In accordance with another preferred embodiment of the present invention, there is provided a fluorescent display device wherein light is emitted by impinging a low speed electron beam on a phosphor layer formed on an anode, wherein the phosphor layer comprises a compound containing W and a compound containing P, K and/or Na.

In the preferred embodiments of the present invention, the compound containing P, K and/or Na may be a compound selected from the group consisting of $K_3PO_4$, $P_2O_5$ and $Na_2SiO_3$, the compound being added to the phosphor layer in an amount of 0.01 to 10.00 wt %.

Further, the phosphor layer may be (Zn,Mg)O system phosphor, ZnO:Zn, $Ln_2O_2S$:Re (wherein Ln is La, Gd or Lu; and Re is Eu or Tb), $ZnGa_2O_4$ or $ZnGa_2O_4$:Mn.

In addition, the phosphor layer may be a compound containing at least one selected from the group consisting of (Zn,Mg)O system phosphor, ZnO:Zn, $Ln_2O_2S$:Re (wherein Ln is La, Gd or Lu; and Re is Eu or Tb), $ZnGa_2O_4$ and $ZnGa_2O_4$:Mn.

In accordance with a further preferred embodiment of the present invention, there is provided a phosphor paste including: a phosphor containing at least one selected from the group consisting of (Zn,Mg)O system phosphor, ZnO:Zn, $Ln_2O_2S$:Re (wherein Ln is La, Gd or Lu; and Re is Eu or Tb), $ZnGa_2O_4$ and $ZnGa_2O_4$:Mn; and a compound containing at least one selected from the group consisting of $K_3PO_4$, $P_2O_5$ and $Na_2SiO_3$, wherein the compound being added to the phosphor in an amount of 0.01 to 10.00 wt %.

In accordance with still another preferred embodiment of the present invention, there is provided a phosphor paste including: a phosphor containing at least one selected from the group consisting of (Zn,Mg)O system phosphor, ZnO:Zn, $Ln_2O_2S$:Re (wherein Ln is La, Gd or Lu; and Re is Eu or Tb), $ZnGa_2O_4$ and $ZnGa_2O_4$:Mn; a first compound containing at least one selected from the group consisting of $K_3PO_4$, $P_2O_5$ and $Na_2SiO_3$, wherein the first compound being added to the phosphor in an amount of 0.01 to 10.00 wt %; and a second compound containing W.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
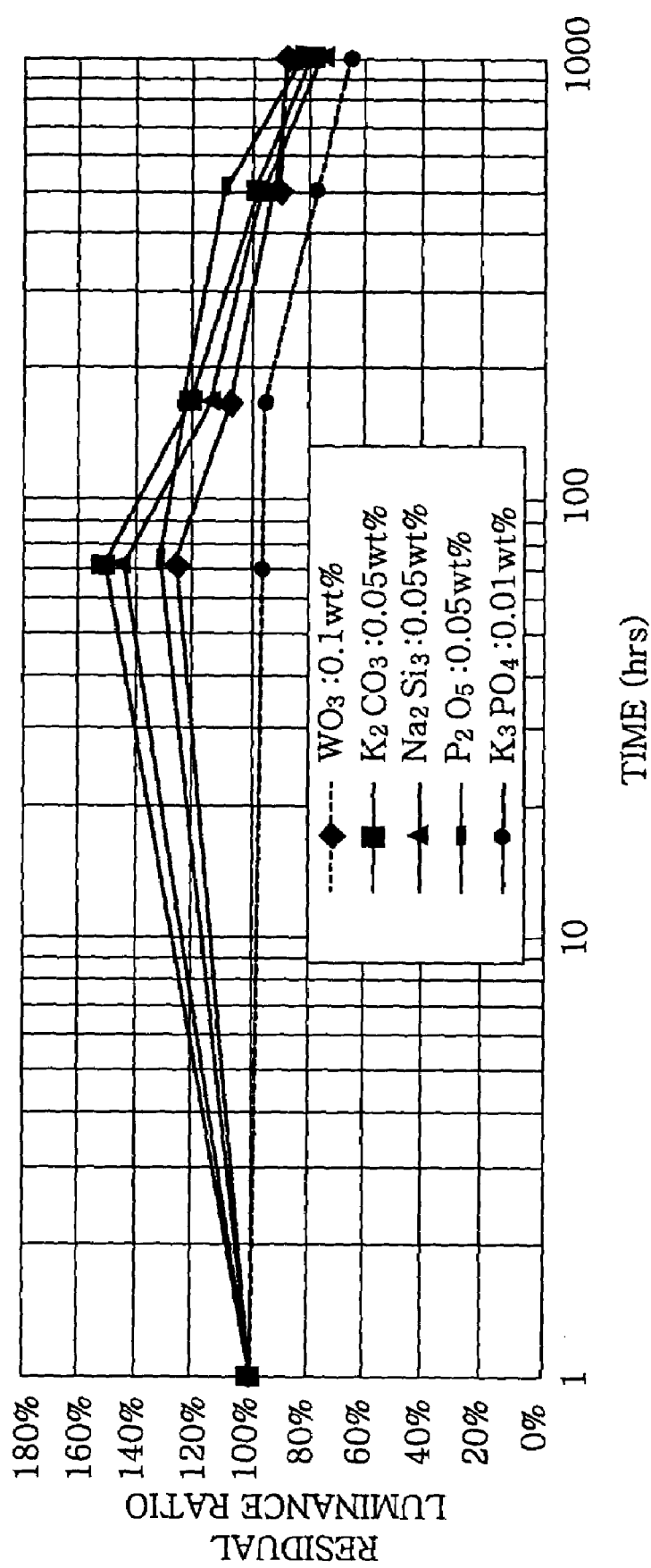
FIG. 1 presents a graph of a luminance residual ratio of a fluorescent display device in accordance with the present invention when $WO_3$ is not added to a phosphor.

The basic concept of the present invention resides in adding a certain material to a phosphor layer of a fluorescent display device to remove even a very small amount of moisture and residual gas remaining in the fluorescent display device kept airtight at a high vacuum. In this way, the initial luminance, luminance residual ratio and high temperature exposure characteristic of the fluorescent display device can be improved. The added material of the present invention may be used with a conventional material such as $WO_3$ and $CaWO_4$.

The added material should have a characteristic that it absorbs even a small amount of residual gas remaining in the fluorescent display device when the device is exposed in an atmosphere at less than a certain temperature (e.g., 85° C.). Further, the added material should keep the residual gas absorbed thereto in an atmosphere at less than a certain temperature (e.g., 27° C.) even after an anode of the device emits light. Also, the added material should not have an adverse effect on the luminescent property of the device.

In a test experiment, it has been found that the added material can exhaust a residual gas occurring from an anode conductor, on which a phosphor layer is formed, of a fluorescent display device at a temperature ranging from 300 to 400° C. during a process of evacuating the interior of the fluorescent display device to a high vacuum. Further, thereafter, the added material has been found to make the residual gas absorbed thereto in a vacuum at a temperature of less than 300 to 400° C.

The added material may contain P, K and/or Na. However, it is preferable that the added material contains P, K and/or Na not as element, but in the form of a compound. The compound containing P, K and/or Na may be $K_3PO_4$, $P_2O_5$ or $Na_2SiO_3$.

Instead of $K_3PO_4$, one of $K_2CrO_4$, $K_2CrO_7$, $K_2SO_4$, $K_2MoO_4$, $KVO_3$, $K_2WO_4$, $K_2O.2B_2O_3$, $KCr(SO_4)_2$, KBr, $KBrO_3$, $K_2CO_3$, $K_2C_2O_4$, KI, $KIO_3$, $KNO_3$, $K_2P_2O_7$, KOH and $K_2S$ may be used as the added material.

Further, instead of $P_2O_5$, one of $H_3PO_4$, $PBr_3$, $POBr_3$, $Ca_3(PO_4)_2$, $Na_2HPO_4$, $Fe_3(PO_4)$, $KH_2PO_4$ and $NaH_2PO_4$ may be used as the added material.

Similarly, instead of $Na_2SiO_3$, one of $NaAlO_2$, $Na_2Al_{22}O_{34}$, $Na_2BO_2$, $Na_2CrO_4$, $Na_2MoO_4$, $5Na_2.12MoO_3$, $Na_2SeO_3$, NaBr, $NaBrO_3$, $NaCO_3$, $NaHCO_3$, $Na_2C_2O_4$, NaI, $NaNO_3$, $NaPO_3$, $Na_2SO_4$ and NaOH may be used as the added material.

Furthermore, in the test experiment, it has been found that the added material, i.e., a compound containing P, K and/or Na, and optionally W, can remove a residual gas remaining in the fluorescent display device at a high vacuum even in an oxidation/deoxidation process carried out when the display device is subject to calcination at a temperature ranging from 300 to 550° C.

In particular, in a fluorescent display device employing a (Zn,Mg)O system phosphor of yellow luminous color, the initial luminance, the luminance residual ratio and the high temperature exposure characteristic of the display device are improved by adding $K_3PO_4$ and/or $WO_3$ to the phosphor.

Further, in a fluorescent display device employing an oxide phosphor such as ZnO:Zn or an oxysulfide phosphor such as $La_2O_2S$:Eu, the initial luminance and the high temperature exposure characteristic of the display device are improved by adding $K_3PO_4$ to the phosphor.

Fluorescent display devices in accordance with the preferred embodiments of the present invention will now be described in detail with reference to the test experiments performed under certain conditions. The experiments were performed with respect to a fluorescent display device employing a (Zn,Mg)O system phosphor of yellow luminous color, which is known to be vulnerable to a residual gas remaining in the device at a high vacuum; and a fluorescent display device employing an oxide phosphor such as ZnO:Zn or an oxysulfide phosphor.

In the experiments, as an example of the (Zn,Mg)O system phosphor, a (Zn,Mg)O:Li phosphor, which was made by Nichia Corporation or Kasei Optonix Ltd, was used.

EXAMPLE 1

In this Example, a mixture of a (Zn,Mg)O system phosphor of yellow luminous color and $K_3PO_4$ was employed in producing a phosphor paste for use in a fluorescent display device. The (Zn,Mg)O system phosphor had a particle size of about 4 μm. Further, $K_3PO_4$ had a particle size of 10 μm or less and was added to form the mixture in an amount of 0.01 to 10.00 wt %.

The mixture, consisting of the (Zn,Mg)O system phosphor of yellow luminous color and $K_3PO_4$, in the amount of 60 wt % and a vehicle, which was produced by dissolving ethyl cellulose in butyl carbitol in a concentration ranging from 2% to 10%, in the amount of 40 wt % were mixed with each other to produce the phosphor paste.

The phosphor paste was applied on an anode conductor formed on an anode substrate in the fluorescent display device, which was subsequently calcined at the temperature of 450° C. Thereafter, a control electrode and a cathode were arranged in the display device. Then, the anode substrate and a casing were pressed against each other, so that an outer periphery of the anode substrate and the casing were sealed to each other to assemble an envelope of the display device. Finally, the envelope thus formed was evacuated to a high vacuum and then sealed, so as to complete the fluorescent display device.

EXAMPLE 2

In this Example, a mixture of a (Zn,Mg)O system phosphor of yellow luminous color, $WO_3$ and $K_3PO_4$ was employed to produce a phosphor paste for use in a fluorescent display device. The (Zn,Mg)O system phosphor had a particle size of about 4 μm. Further, $WO_3$ had a particle size of 0.2 to 0.3 μm and was added in the amount of 0.05 wt %. $K_3PO_4$ had a particle size of less than or equal to 10 μm and was added in an amount of 0.01 to 10.00 wt %.

The mixture, consisting of the (Zn,Mg)O system phosphor of yellow luminous color, $WO_3$ and $K_3PO_4$, in the amount of 60 wt % and a vehicle, which was produced by dissolving ethyl cellulose in butyl carbitol in a concentration ranging from 2% to 10%, in the amount of 40 wt % were mixed with each other to produce the phosphor paste.

The phosphor paste was applied on an anode conductor formed on an anode substrate in the fluorescent display device, which was subsequently calcined at the temperature of 450° C. Thereafter, a control electrode and a cathode were arranged in the display device. Then, the anode substrate and a casing were pressed against each other, so that an outer periphery of the anode substrate and the casing were sealed to each other to assemble an envelope of the display device. Finally, the envelope thus formed was evacuated to a high vacuum and then sealed, so as to complete the fluorescent display device.

TABLE 2

| | $K_3PO_4$ | | $K_3PO_4$ + $WO_3$ (0.05 wt %) | |
|---|---|---|---|---|
| Amount added (wt %) | Luminance residual ratio (after 1,000 hours) | High temperature exposure characteristic (after 72 hours) | Luminance residual ratio (after 1,000 hours) | High temperature exposure characteristic (after 72 hours) |
| 0.01 | ◨90% | ☐68% | ◨83% | ☐72% |
| 0.05 | ◨85% | ☐75% | ◨80% | ◨83% |
| 0.1 | ◨78% | ◨82% | ◨78% | ◨95% |
| 0.4 | ◨73% | ◨90% | ◨70% | ◨97% |
| 1 | ◨70% | ◨93% | ☐65% | ◨99% |
| 2 | ☐65% | ◨95% | ☐62% | ◨99% |
| 5 | ☐60% | ◨95% | ☐48% | ◨102% |
| 10 | ☐50% | ◨97% | ☐48% | ◨105% |

Table 2 presents the luminance residual ratio and the high temperature exposure characteristic data, obtained from Examples 1 and 2, of a fluorescent display device employing the (Zn,Mg)O system phosphor of yellow luminous color, to which $K_3PO_4$ or $K_3PO_4$+$WO_3$ was added.

In Table 2, the symbol "◨" indicates a case that the luminance residual ratio is more than or equal to 70%. The symbol "☐" indicates a case that the luminance residual ratio, although it is less than 70%, is improved in comparison with the luminance residual ratio of the conventional fluorescent display device when $K_3PO_4$ or $K_3PO_4$+$WO_3$ is added to the phosphor in an amount ranging from 0.01 to 10.00 wt %.

Referring to Table 2, in Example 1 wherein only $K_3PO_4$ was added in an amount of 0.01 to 1.00 wt % to the phosphor, the luminance residual ratio was more than or equal to 70%, which is higher than that of the conventional fluorescent display device (Table 1), as indicated by "◨".

Even when only $K_3PO_4$ was added in an amount of 2.00 to 10.00 wt % to the phosphor, the luminance residual ratio was higher than that of the conventional fluorescent display device (Table 1) as indicated by "☐".

Further, when only $K_3PO_4$ was added in an amount of 0.10 to 10.00 wt % to the phosphor, the high temperature exposure characteristic was more than or equal to 80%, which is higher than that of the conventional fluorescent display device (Table 1), as indicated by "◨".

Even when only $K_3PO_4$ was added in an amount of 0.01 to 0.05 wt % to the phosphor, the high temperature exposure characteristic was higher than that of the conventional fluorescent display device (Table 1) as indicated by "☐".

As described above, the fluorescent display device including a phosphor layer, to which only $K_3PO_4$ was added in an amount of 0.01 to 10.00 wt %, has a higher luminance residual ratio and a higher high temperature exposure characteristic than those of the conventional fluorescent display device (Table 1) employing a (Zn,Mg)O system phosphor of yellow luminous color, to which only $WO_3$ was added in an amount of 0.01 to 10.00 wt %.

Particularly, when only $K_3PO_4$ was added in an amount of 0.10 to 1.00 wt % to the (Zn,Mg)O system phosphor of yellow luminous color, both the luminance residual ratio and the high temperature exposure characteristic were considerably improved in comparison with those of the conventional fluorescent display device (Table 1).

Meanwhile, in Example 2 wherein $K_3PO_4$ in an amount of 0.01 to 0.40 wt % and $WO_3$ in the amount of 0.05 wt % were added to a (Zn,Mg)O system phosphor of yellow luminous color, the luminance residual ratio was more than or equal to 70%, which is higher than that of the conventional fluorescent display device (Table 1), as indicated by "▣".

Even when $K_3PO_4$ was added in an amount of 1.00 to 10.00 wt % to the phosphor with $WO_3$ in the amount of 0.05 wt %, the luminance residual ratio was higher than that of the conventional fluorescent display device (Table 1) as indicated by "□".

Further, when $K_3PO_4$ was added in an amount of 0.05 to 10.00 wt % to the phosphor with $WO_3$ in the amount of 0.05 wt %, the high temperature exposure characteristic was more than 80%, which is higher than that of the conventional fluorescent display device (Table 1), as indicated by "▣".

Even when $K_3PO_4$ was added in the amount of 0.01 wt % to the phosphor with $WO_3$ in the amount of 0.05 wt %, the high temperature exposure characteristic was higher than that of the conventional fluorescent display device (Table 1) as indicated by "□".

As described above, the fluorescent display device including a phosphor layer containing a (Zn,Mg)O system phosphor of yellow luminous color, to which $WO_3$ in the amount of 0.05 wt % and $K_3PO_4$ in an amount of 0.01 to 10.00 wt % were added, has a higher luminance residual ratio and a higher high temperature exposure characteristic than those of the conventional fluorescent display device (Table 1) employing a (Zn,Mg)O system phosphor of yellow luminous color, to which only $WO_3$ was added in an amount of 0.01 to 10.00 wt %.

Particularly, when $K_3PO_4$ was added in an amount of 0.05 to 1.00 wt % to the (Zn,Mg)O system phosphor with $WO_3$ in the amount of 0.05 wt %, both the luminance residual ratio and the high temperature exposure characteristic were considerably improved in comparison with those of the conventional fluorescent display device (Table 1).

Further, when $K_3PO_4$ was added in the amount of 0.05 wt % to the (Zn,Mg)O system phosphor with $WO_3$ in the amount of 0.05 wt %, the initial luminance of the fluorescent display device was 300 cd/m$^2$, which is 50% higher than that (200 cd/m$^2$) of the conventional fluorescent display device wherein $WO_3$ was added in the amount of 0.10 wt % to the phosphor.

Although $K_3PO_4$ was used as the compound added to the phosphor used in Examples 1 and 2, one of $K_2CrO_4$, $K_2CrO_7$, $K_2SO_4$, $K_2MoO_4$, $KVO_3$, $K_2WO_4$, $K_2O \cdot 2B_2O_3$, $KCr(SO_4)_2$, $KBr$, $KBrO_3$, $K_2CO_3$, $K_2C_2O_4$, $KI$, $KIO_3$, $KNO_3$, $K_2P_2O_7$, $KOH$ and $K_2S$ may be used as the addition material.

EXAMPLE 3

In this Example, a mixture of a ZnO:Zn phosphor and $K_3PO_4$ or $K_3PO_4+WO_3$ was employed in producing a phosphor paste for use in a fluorescent display device. $K_3PO_4$ had a particle size of 10 μm or less and was added in an amount of 0.01 to 10.00 wt %. In addition, $WO_3$ was added in the amount of 0.1 wt % to the compound.

The mixture in the amount of 60 wt % and a vehicle, which was produced by dissolving ethyl cellulose in butyl carbitol in a concentration ranging from 2% to 10%, in the amount of 40 wt % were mixed with each other to produce the phosphor paste.

The fluorescent display device employing the phosphor paste was implemented in the same manner as described in Example 1.

Table 3 presents the luminance residual ratio and the high temperature exposure characteristic data, obtained from Example 3, of the fluorescent display device employing a ZNO:Zn phosphor, to which $K_3PO_4$ or $K_3PO_4+WO_3$ was added.

TABLE 3

| | $K_3PO_4$ | | $K_3PO_4 + WO_3$ (0.1 wt %) | |
|---|---|---|---|---|
| Amount added (wt %) | Initial luminance (cd/m$^2$) | High temperature exposure characteristic (after 72 hours) | Initial luminance (cd/m$^2$) | High temperature exposure characteristic (after 72 hours) |
| 0 | 100 | 54 | 200 | 75 |
| 0.01 | 130 | 75 | 220 | 88 |
| 0.02 | 150 | 88 | 220 | 89 |
| 0.05 | 158 | 90 | 230 | 89 |
| 0.1 | 145 | 91 | 210 | 90 |
| 0.2 | 133 | 90 | 210 | 89 |
| 0.5 | 122 | 90 | 205 | 91 |
| 1 | 110 | 91 | 202 | 90 |
| 2 | 100 | 92 | 190 | 92 |
| 5 | 80 | 90 | 175 | 91 |
| 10 | 62 | 92 | 165 | 92 |

As shown in Table 3, by adding $K_3PO_4$ or $K_3PO_4+WO_3$ to the ZnO:Zn phosphor employed in the fluorescent display device, both the initial luminance and the temperature exposure characteristic of the device became higher than those of the conventional fluorescent display device, at least when the added amount was within the range of about 1.00 wt %.

Further, after the fluorescent display device was disassembled, an analysis of a surface of the phosphor of the display device was performed. A result of the analysis showed that a small amount of Zn, O, K and P was contained in the phosphor, which means that K and P may contribute to an improvement of the initial luminance and the temperature exposure characteristic of the display device.

EXAMPLE 4

In this Example, a fluorescent display device including a phosphor layer containing a $Ln_2O_2S$:Re (wherein Ln is La, Gd or Lu; and Re is Eu or Tb) phosphor, to which ZnO was added as a conductive agent, was provided. Further, $K_3PO_4$ was added in the amount of 0.05 wt % to the phosphor.

Table 4 provides the data on the ratio of an initial luminance of the fluorescent display device obtained from this Example to the initial luminance of the fluorescent display device wherein $K_3PO_4$ was not added to the phosphor.

TABLE 4

|  | Amount of $K_3PO_4$ added | |
|---|---|---|
|  | 0 wt % | 0.05 wt % |
| $La_2O_2S$:Tb | 100% | 150% |
| $Gd_2O_2S$:Eu | 100% | 170% |
| $Gd_2O_2S$:Tb | 100% | 172% |
| $Lu_2O_2S$:Eu | 100% | 142% |
| $Lu_2O_2S$:Tb | 100% | 135% |

As shown in Table 4, by adding $K_3PO_4$ in the amount of 0.05 wt % to the phosphor layer containing the $Ln_2O_2S$:Re (wherein Ln is La, Gd or Lu; and Re is Eu or Tb) phosphor, to which ZnO was added as a conductive agent, the initial luminance of the fluorescent display device was drastically improved.

Table 5 describes the initial luminance of a fluorescent display device having a phosphor layer containing a $La_2O_2S$:Eu phosphor, to which ZnO was added in the amount of 10.00 wt % as a conductive agent and $K_3PO_4$ having a particle size of 10 μm or less was added in an amount of 0.005 to 10.00 wt %.

The phosphor in the amount of 60 wt % and a vehicle, which was made by dissolving ethyl cellulose in butyl carbitol in a concentration ranging from 2% to 10%, in the amount of 40 wt % were dispersed to produce the phosphor paste.

The fluorescent display device employing the phosphor paste was implemented in the same manner as described in Example 1.

TABLE 5

| $K_3PO_4$ | |
|---|---|
| Amount added (wt %) | Initial luminance (cd/m$^2$) |
| 0 (ref) | 100 |
| 0.005 | 105 |
| 0.01 | 145 |
| 0.02 | 170 |
| 0.05 | 220 |
| 0.1 | 165 |
| 0.2 | 150 |
| 0.5 | 125 |
| 1 | 108 |
| 2 | 102 |
| 5 | 93 |
| 10 | 66 |

As shown in Table 5, the initial luminance of the fluorescent display device shows an improvement when the amount of $K_3PO_4$ added ranges from 0.005 to 2.00 wt %. However, when the amount of adding $K_3PO_4$ is larger than 5.00 wt %, the initial luminance becomes lower than the reference value.

In contrast with the fluorescent display device employing the $Lu_2O_2S$:Eu phosphor to which $K_3PO_4$ was added in the amount of 0.05 wt %, wherein the initial luminance was improved by 142% as shown in Table 4, the fluorescent display device employing the $La_2O_2S$:Eu phosphor has the initial luminance improved by 120% in comparison with the reference initial luminance as shown in Table 5, when $K_3PO_4$ was added in the amount of 0.05 wt %.

Further, an analysis of the surface of the phosphor by using the ESCA (electron spectroscopy for chemical analysis) method showed that the ratio of a signal of S contained in the $Ln_2O_2S$:Re (wherein Ln is La, Gd or Lu; and Re is Eu or Tb) phosphor to that of $SO_4$, which indicates the degree of oxidation of the surface of the phosphor, was 35.00% when $K_3PO_4$ was not added to the phosphor. However, the ratio decreased to 10.00% when $K_3PO_4$ was added to the phosphor.

Based on the above analysis, it is believed that $K_3PO_4$ prevents deterioration of the luminescence property of the fluorescent display device having a phosphor layer containing a $La_2O_2S$:Eu phosphor, to which ZnO is added as a conductive agent.

EXAMPLE 5

In this Example, a fluorescent display device having a phosphor layer containing a $La_2O_2S$:Tb, $Lu_2O_2$:Eu, $Cd_2O_2S$:Eu, $Lu_2O_2S$:Tb or $Gd_2O_2S$:Tb phosphor, to which $K_3PO_4$ was added in the amount of 0.02 wt %, were investigated in the same manner as described in Example 1.

In this Example, by adding $K_3PO_4$ to the phosphor, the initial luminance of the display device became higher than that of the conventional fluorescent display device.

EXAMPLE 6

In this Example, a mixture of a (Zn,Mg)O system phosphor of yellow luminous color and $P_2O_5$ was employed in producing a phosphor paste used in a fluorescent display device.

The fluorescent display device in accordance with this Example was implemented in the same manner as described in Example 1 except that the addition to the phosphor was $P_2O_5$ instead of $K_3PO_4$.

EXAMPLE 7

In this Example, a mixture of a (Zn,Mg)O system phosphor of yellow luminous color and $P_2O_5+WO_3$ was employed in producing a phosphor paste for use in a fluorescent display device.

The fluorescent display device in accordance with this Example was implemented in the same manner as described in Example 2 except that the addition to the phosphor was $P_2O_5+WO_3$ instead of $K_3PO_4+WO_3$.

Table 6 presents the luminance residual ratio and the high temperature exposure characteristic data, obtained from Examples 6 and 7, of a fluorescent display device employing a (Zn,Mg)O system phosphor of yellow luminous color, to which $P_2O_5$ or $P_2O_5+WO_3$ was added.

TABLE 6

| | $P_2O_5$ | | $P_2O_5 + WO_3$ (0.05 wt %) | |
|---|---|---|---|---|
| Amount added (wt %) | Luminance residual ratio (after 1,000 hours) | High temperature exposure characteristic (after 72 hours) | Luminance residual ratio (after 1,000 hours) | High temperature exposure characteristic (after 72 hours) |
| 0.01 | 88% | 63% | 84% | 69% |
| 0.05 | 85% | 73% | 80% | 77% |
| 0.1 | 83% | 78% | 76% | 83% |
| 0.4 | 80% | 80% | 71% | 87% |
| 1 | 75% | 83% | 65% | 91% |
| 2 | 70% | 87% | 60% | 93% |
| 5 | 65% | 90% | 57% | 95% |
| 10 | 55% | 94% | 48% | 95% |

Referring to Table 6, in Example 6 wherein only P$_2$O$_5$ was added in an amount of 0.01 to 2.00 wt % to the phosphor, the luminance residual ratio was higher than or equal to 70%, showing a significant improvement over the conventional fluorescent display device (Table 1), as indicated by "▣".

Even when P$_2$O$_5$ was added in an amount of 5.00 to 10.00 wt % to the phosphor, the luminance residual ratio was higher than that of the conventional fluorescent display device (Table 1) as indicated by "□".

Further, when P$_2$O$_5$ was added in an amount of 0.40 to 10.00 wt % to the phosphor, the high temperature exposure characteristic was higher than or equal to 80%, which shows an improvement over the conventional fluorescent display device (Table 1), as indicated by "▣".

Even when P$_2$O$_5$ was added in an amount of 0.01 to 0.10 wt % to the phosphor, the high temperature exposure characteristic was higher than that of the conventional fluorescent display device (Table 1) as indicated by "□".

As described above, the fluorescent display device including a phosphor layer, to which P$_2$O$_5$ was added in an amount of 0.01 to 10.00 wt %, has a higher luminance residual ratio and a higher high temperature exposure characteristic than those of the conventional fluorescent display device (Table 1) employing the (Zn,Mg)O system phosphor of yellow luminous color, to which only WO$_3$ was added in an amount of 0.01 to 10.00 wt %.

Particularly, when P$_2$O$_5$ was added in an amount of 0.40 to 1.00 wt % to the phosphor, both the luminance residual ratio and the high temperature exposure characteristic were considerably improved in comparison with those of the conventional fluorescent display device (Table 1).

Meanwhile, in Example 7 wherein P$_2$O$_5$ in an amount of 0.01 to 0.40 wt % and WO$_3$ in the amount of 0.05 wt % were added to the phosphor, the luminance residual ratio was more than 70%, which is higher than that of the conventional fluorescent display device (Table 1), as indicated by "▣".

Even when P$_2$O$_5$ was added in an amount of 0.40 to 10.00 wt % to the phosphor with WO$_3$ in the amount of 0.05 wt %, the luminance residual ratio was higher than that of the conventional fluorescent display device (Table 1) as indicated by "□".

Further, when P$_2$O$_5$ was added in an amount of 0.10 to 10.00 wt % to the phosphor with WO$_3$ in the amount of 0.05 wt %, the high temperature exposure characteristic was more than 80%, which is higher than that of the conventional fluorescent display device (Table 1), as indicated by "▣".

Even when P$_2$O$_5$ was added in an amount of 0.01 to 0.05 wt % to the phosphor with WO$_3$ in the amount of 0.05 wt %, the high temperature exposure characteristic was higher than that of the conventional fluorescent display device (Table 1) as indicated by "□".

As described above, the fluorescent display device including a phosphor layer containing the (Zn,Mg)O system phosphor of yellow luminous color with WO$_3$ in the amount of 0.05 wt %, to which P$_2$O$_5$ was added in an amount of 0.01 to 10.00 wt %, has a higher luminance residual ratio and a higher high temperature exposure characteristic than those of the conventional fluorescent display device (Table 1) employing the (Zn,Mg)O system phosphor of yellow luminous color, to which only WO$_3$ was added in an amount of 0.01 to 10.00 wt %.

Particularly, when P$_2$O$_5$ was added in an amount of 0.10 to 0.40 wt % to the phosphor with WO$_3$ in the amount of 0.05 wt %, both the luminance residual ratio and the high temperature exposure characteristic were considerably improved in comparison with those of the conventional fluorescent display device (Table 1).

Further, when P$_2$O$_5$ was added in the amount of 0.10 wt % to the phosphor with WO$_3$ in the amount of 0.05 wt %, the initial luminance of the fluorescent display device was 200 cd/m$^2$, which is equal to that of the conventional fluorescent display device wherein WO$_3$ was added in the amount of 0.10 wt % to the phosphor.

Although P$_2$O$_5$ was used as the addition material to the phosphor used in Examples 6 and 7 of the present invention, any one of H$_3$PO$_4$, PBr$_3$, POBr$_3$, Ca$_3$(PO$_4$)$_2$, Na$_2$HPO$_4$, Fe$_3$(PO$_4$), KH$_2$PO$_4$ and NaH$_2$PO$_4$ may be used as the additive.

EXAMPLE 8

In this Example, a mixture of a (Zn,Mg)O system phosphor of yellow luminous color and Na$_2$SiO$_3$ was employed in producing a phosphor paste for use in a fluorescent display device.

The fluorescent display device in accordance with this Example was implemented in the same manner as described in Example 1 except that the additive to the phosphor was Na$_2$SiO$_3$ instead of K$_3$PO$_4$.

EXAMPLE 9

In this Example, a mixture of a (Zn,Mg)O system phospor of yellow luminous color and Na$_2$SiO$_3$+WO$_3$ was employed in producing a phosphor paste for use in a fluorescent display device.

The fluorescent display device in accordance with this Example was implemented in the same manner as described in Example 2 except that the addition to the phosphor was Na$_2$SiO$_3$+WO$_3$ instead of K$_3$PO$_4$+WO$_3$.

Table 7 presents the luminance residual ratio and the high temperature exposure characteristic data, obtained from Examples 8 and 9, of the fluorescent display device employing a (Zn,Mg)O system phosphor of yellow luminous color, to which Na$_2$SiO$_3$ or Na$_2$SiO$_3$+WO$_3$ was added.

TABLE 7

| | Na$_2$SiO$_3$ | | Na$_2$SiO$_3$ + WO$_3$ (0.05 wt %) | |
| --- | --- | --- | --- | --- |
| Amount added (wt %) | Luminance residual ratio (after 1,000 hours) | High termperature exposure characteristic (after 72 hours) | Luminance residual ratio (after 1,000 hours) | High temperature exposure characteristic (after 72 hours) |
| 0.01 | ▣84% | □63% | ▣80% | □67% |
| 0.05 | ▣78% | □70% | ▣76% | □77% |
| 0.1 | ▣75% | ▣80% | ▣70% | ▣88% |
| 0.4 | ▣70% | ▣83% | □63% | ▣97% |
| 1 | □68% | ▣87% | □60% | ▣101% |
| 2 | □50% | ▣90% | □45% | ▣103% |
| 5 | □45% | ▣92% | □37% | ▣105% |
| 10 | □35% | ▣94% | □30% | ▣107% |

Referring to Table 7, in Example 8 wherein Na$_2$SiO$_3$ was added in an amount of 0.01 to 0.40 wt % to the phosphor, the luminance residual ratio was more than or equal to 70%, which is higher than that of the conventional fluorescent display device (Table 1), as indicated by "▣".

Even when Na$_2$SiO$_3$ was added in an amount of 1.00 to 10.00 wt % to the phosphor, the luminance residual ratio was higher than that of the conventional fluorescent display device (Table 1) as indicated by "□".

Further, when $Na_2SiO_3$ was added in an amount of 0.10 to 10.00 wt % to the phosphor, the high temperature exposure characteristic was more than or equal to 80%, which is higher than that of the conventional fluorescent display device (Table 1), as indicated by "◨".

Even when $Na_2SiO_3$ was added in an amount of 0.01 to 0.05 wt % to the phosphor, the high temperature exposure characteristic was higher than that of the conventional fluorescent display device (Table 1) as indicated by "□".

As described above, the fluorescent display device including a phosphor layer, to which only $Na_2SiO_3$ was added in an amount of 0.01 to 10.00 wt %, has a higher luminance residual ratio and a higher high temperature exposure characteristic than those of the conventional fluorescent display device (Table 1) employing the (Zn,Mg)O system phosphor of yellow luminous color, to which only $WO_3$ was added in an amount of 0.01 to 10.00 wt %.

Particularly, when only $Na_2SiO_3$ was added in an amount of 0.10 to 0.40 wt % to the phosphor, both the luminance residual ratio and the high temperature exposure characteristic were considerably improved in comparison with those of the conventional fluorescent display device (Table 1).

On the other hand, in Example 9 wherein $Na_2SiO_3$ in an amount of 0.01 to 0.40 wt % and $WO_3$ in the amount of 0.05 wt % were added to the (Zn,Mg)O system phosphor of yellow luminous color, the luminance residual ratio was more than or equal to 70%, which is higher than that of the conventional fluorescent display device (Table 1), as indicated by "◨".

Even when $Na_2SiO_3$ was added in an amount of 1.00 to 10.00 wt % to the phosphor with $WO_3$ in the amount of 0.05 wt %, the luminance residual ratio was higher than that of the conventional fluorescent display device (Table 1) as indicated by "□".

Further, when $Na_2SiO_3$ was added in an amount of 0.10 to 10.00 wt % to the phosphor with $WO_3$ in the amount of 0.05 wt %, the high temperature exposure characteristic was more than or equal to 88%, which is higher than that of the conventional fluorescent display device (Table 1), as indicated by "◨".

Even when $Na_2SiO_3$ was added in an amount of 0.01 to 0.05 wt % to the phosphor with $WO_3$ in the amount of 0.05 wt %, the high temperature exposure characteristic was higher than that of the conventional fluorescent display device (Table 1) as indicated by "□".

As described above, the fluorescent display device including a phosphor layer containing the (Zn,Mg)O system phosphor of yellow luminous color with $WO_3$ in the amount of 0.05 wt %, to which $Na_2SiO_3$ was added in an amount of 0.01 to 10.00 wt %, has a higher luminance residual ratio and a higher high temperature exposure characteristic than those of the conventional fluorescent display device (Table 1) employing the (Zn,Mg)O system phosphor of yellow luminous color, to which only $WO_3$ was added in an amount of 0.01 to 10.00 wt %.

Particularly, when $Na_2SiO_3$ was added in the amount of 0.10 wt % to the phosphor with $WO_3$ in the amount of 0.05 wt %, both the luminance residual ratio and the high temperature exposure characteristic were considerably improved in comparison with those of the conventional fluorescent display device (Table 1).

Further, when $Na_2SiO_3$ was added in the amount of 0.05 wt % to the phosphor with $WO_3$ in the amount of 0.05 wt %, the initial luminance of the fluorescent display device was 200 cd/m², which is equal to that of the conventional fluorescent display device wherein $WO_3$ was added in the amount of 0.10 wt % to the phosphor.

EXAMPLE 10

In this Example, a mixture of a (Zn,Mg)O system phosphor of yellow luminous color and $K_2CO_3$ was employed in producing a phosphor paste for use in a fluorescent display device.

The fluorescent display device in accordance with this Example was implemented in the same manner as described in Example 1 except that the additive to the phosphor was $K_2CO_3$ instead of $K_3PO_4$.

EXAMPLE 11

In this Example, a mixture of a (Zn,Mg)O system phosphor of yellow luminous color and $K_2CO_3+WO_3$ was employed in producing a phosphor paste for use in a fluorescent display device.

The fluorescent display device in accordance with this Example was implemented in the same manner as described in Example 2 except that the addition to the phosphor was $K_2CO_3+WO_3$ instead of $K_3PO_4+WO_3$.

Table 8 presents the luminance residual ratio and the high temperature exposure characteristic data, obtained from Examples 10 and 11, of the fluorescent display device employing a (Zn,Mg)O system phosphor of yellow luminous color, to which $K_2CO_3$ or $K_2CO_3+WO_3$ was added.

TABLE 8

| | $K_2CO_3$ | | $K_2CO_3$ + $WO_3$ (0.05 wt %) | |
| --- | --- | --- | --- | --- |
| Amount added (wt %) | Luminance residual ratio (after 1,000 hours) | High temperature exposure characteristic (after 72 hours) | Luminance residual ratio (after 1,000 hours) | High temperature exposure characteristic (after 72 hours) |
| 0.01 | ◨87% | □64% | ◨81% | □71% |
| 0.05 | ◨82% | □73% | ◨75% | □78% |
| 0.1 | ◨80% | ◨85% | □73% | ◨90% |
| 0.4 | □75% | ◨95% | □68% | ◨96% |
| 1 | ◨70% | ◨96% | □65% | ◨97% |
| 2 | □53% | ◨97% | □48% | ◨97% |
| 5 | □46% | ◨98.7% | □40% | ◨99% |
| 10 | □23% | ◨98% | □20% | ◨100% |

Referring to Table 8, in Example 10 wherein only $K_2CO_3$ was added in an amount of 0.01 to 1.00 wt % to the phosphor, the luminance residual ratio was more than or equal to 70%, which is higher than that of the conventional fluorescent display device (Table 1), as indicated by "◨".

Even when only $K_2CO_3$ was added in an amount of 2.00 to 10.00 wt % to the phosphor, the luminance residual ratio was higher than that of the conventional fluorescent display device (Table 1) as indicated by "□".

Further, when only $K_2CO_3$ was added in an amount of 0.10 to 10.00 wt % to the phosphor, the high temperature exposure characteristic was more than or equal to 85%, which is higher than that of the conventional fluorescent display device (Table 1), as indicated by "◨".

Even when only $K_2CO_3$ was added in an amount of 0.01 to 0.05 wt % to the phosphor, the high temperature exposure characteristic was higher than that of the conventional fluorescent display device (Table 1) as indicated by "□".

As described above, the fluorescent display device including a phosphor layer containing the (Zn,Mg)O system phosphor of yellow luminous color, to which only $K_2CO_3$ was added in an amount of 0.01 to 10.00 wt %, has a higher luminance residual ratio and a higher high temperature exposure characteristic than those of the conventional fluorescent display device (Table 1) employing the (Zn,Mg)O system phosphor of yellow luminous color, to which only $WO_3$ was added in an amount of 0.01 to 10.00 wt %.

Particularly, when only $K_2CO_3$ was added in an amount of 0.05 to 10.00 wt % to the phosphor, both the luminance residual ratio and the high temperature exposure characteristic were considerably improved in comparison with those of the conventional fluorescent display device (Table 1).

In case of Example 11 wherein $K_2CO_3$ in an amount of 0.01 to 0.10 wt % and $WO_3$ in the amount of 0.05 wt % were added to the (Zn,Mg)O system phosphor of yellow luminous color, the luminance residual ratio was more than or equal to 70%, which is higher than that of the conventional fluorescent display device (Table 1), as indicated by "◘".

Even when $K_2CO_3$ was added in an amount of 0.40 to 10.00 wt % to the phosphor with $WO_3$ in the amount of 0.05 wt %, the luminance residual ratio was higher than that of the conventional fluorescent display device (Table 1) as indicated by "□".

Further, when $K_2CO_3$ was added in an amount of 0.01 to 0.40 wt % to the phosphor with $WO_3$ in the amount of 0.05 wt %, the high temperature exposure characteristic was more than or equal to 80%, which is higher than that of the conventional fluorescent display device (Table 1), as indicated by "◘".

Even when $K_2CO_3$ was added in the amount of 0.01 wt % to the phosphor with $WO_3$ in the amount of 0.05 wt %, the high temperature exposure characteristic was higher than that of the conventional fluorescent display device (Table 1) as indicated by "□".

As described above, the fluorescent display device including a phosphor layer containing the (Zn,Mg)O system phosphor of yellow luminous color with $WO_3$ in the amount of 0.05 wt %, to which $K_2CO_3$ was added in an amount of 0.01 to 10.00 wt %, has a higher luminance residual ratio and a higher high temperature exposure characteristic than those of the conventional fluorescent display device (Table 1) employing the (Zn,Mg)O system phosphor of yellow luminous color, to which only $WO_3$ was added in an amount of 0.01 to 10.00 wt %.

Particularly, when $K_2CO_3$ was added in the amount of 0.10 wt % to the phosphor with $WO_3$ in the amount of 0.05 wt %, both the luminance residual ratio and the high temperature exposure characteristic were considerably improved in comparison with those of the conventional fluorescent display device (Table 1).

Further, when $K_2CO_3$ was added in the amount of 0.05 wt % to the phosphor with $WO_3$ in the amount of 0.05 wt %, the initial luminance of the fluorescent display device was 200 $cd/m^2$, which is equal to that of the conventional fluorescent display device wherein $WO_3$ was added in the amount of 0.10 wt % to the phosphor.

FIG. 1 illustrates the luminance residual ratios, which were more than or equal to 70%, of fluorescent display devices in accordance with Examples 1, 2 and 6 to 11 of the present invention when $WO_3$ was not added to the phosphor.

As shown in FIG. 1, the fluorescent display devices in accordance with the present invention have higher luminance residual ratios than the conventional fluorescent display device using the phosphor to which only $WO_3$ was added.

Figure 2:
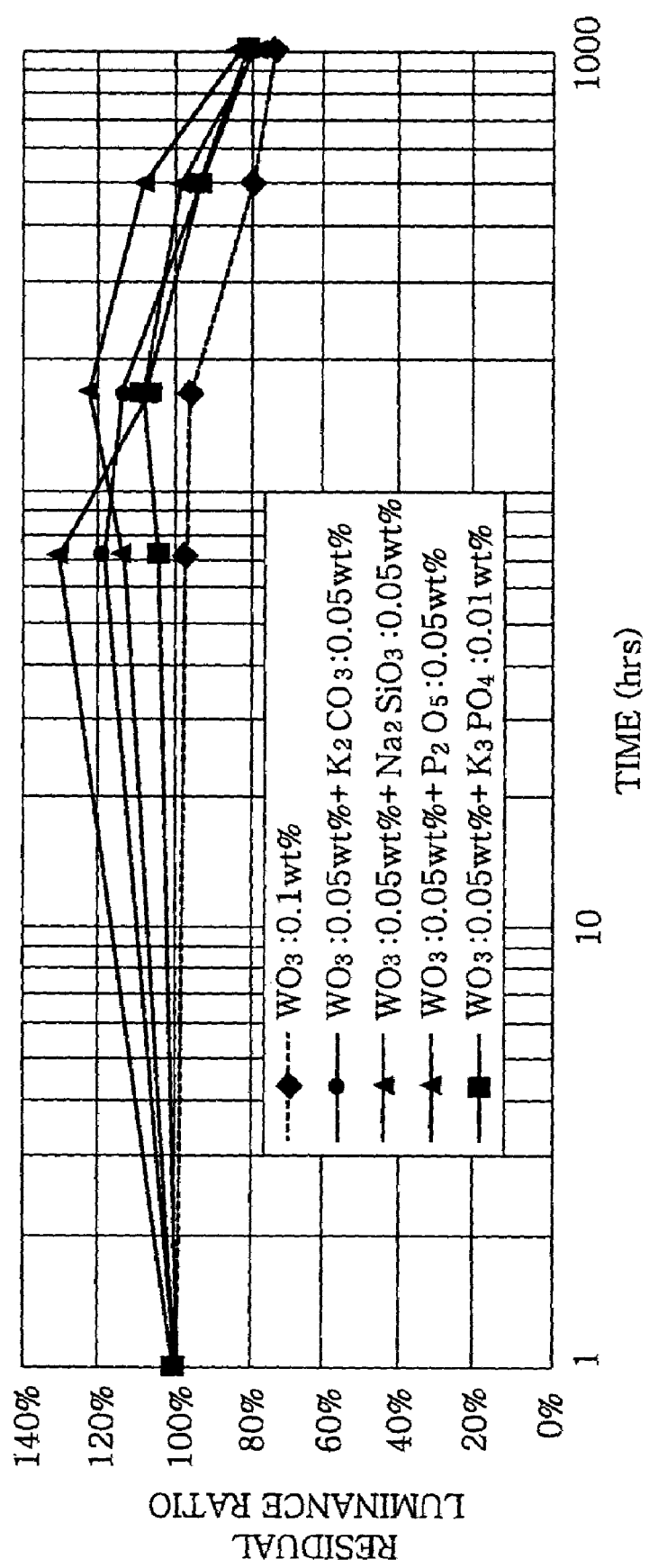
FIG. 2 provides a graph of a luminance residual ratio of a fluorescent display device in accordance with the present invention when $WO_3$ is added to a phosphor.
Figure 3:
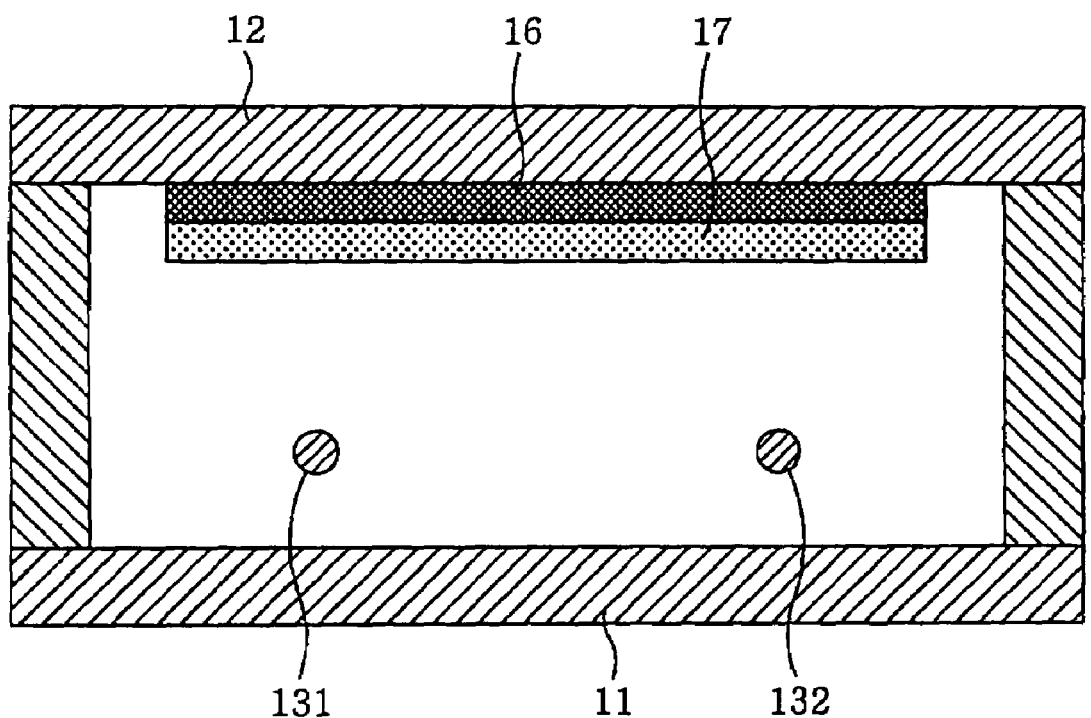
FIG. 3 shows a cross sectional view of a conventional fluorescent display device.

FIG. 2 displays the luminance residual ratios, which were more than or equal to 70%, of fluorescent display devices in accordance with Examples 1 to 6 of the present invention when $WO_3$ was added to the phosphor.

As shown in FIG. 2, the fluorescent display devices in accordance with the present invention have higher luminance residual ratios than the conventional fluorescent display device using the phosphor to which only $WO_3$ was added.

EXAMPLE 12

In this Example, a mixture of a (Zn,Mg)O system phosphor of yellow luminous color and $P_2O_5$ was employed in producing a phosphor paste for use in a fluorescent display device.

The fluorescent display device in accordance with this Example was implemented in the same manner as described in Example 1 except that, instead of $K_3PO_4$, $P_2O_5$ was added in the amount of 0.02 wt % to the phosphor.

In this case, the initial luminance of the fluorescent display device was 175% of the initial luminance (or reference luminance) of a display device wherein nothing is added to the phosphor. Further, the high temperature exposure characteristic of the display device was 90%, which is an improvement over a high temperature exposure characteristic (53%) of the conventional fluorescent display device.

EXAMPLE 13

In this Example, a mixture of a $ZnGa_2O_4$ phosphor of blue luminous color and $K_3PO_4$ was employed in producing a phosphor paste for use in a fluorescent display device. Further, another mixture of a $Zn(Ga,Al)_2O_4$:Mn phosphor and $K_3PO_4$ was employed in producing another phosphor paste for use in a fluorescent display device.

The fluorescent display devices in accordance with this Example were implemented in the same manner as described in Example 1 except that $K_3PO_4$ was added in the amount of 0.001 wt % to the phosphor.

In this case, the high temperature exposure characteristic of the display device employing the $ZnGa_2O_4$ phosphor was 95%, which is an improvement over the high temperature exposure characteristic (85%) of the conventional fluorescent display device. Also, the high temperature exposure characteristic of the display device employing the $Zn(Ga,Al)_2O_4$:Mn phosphor was 95%, which is an improvement over the high temperature exposure characteristic (70%) of the conventional fluorescent display device.

The above-mentioned compounds containing P, K and/or Na may be added to a ZnMgO system phosphor, a ZnO:Zn system phosphor, a $Ln_2O_2S$ system phosphor, a $Ga_2O_2S$ system phosphor, $SrTiO_3$ system phosphor or a ZnS:Zn system phosphor for use in a fluorescent display device. In these cases, the fluorescent display device can obtain a higher luminance residual ratio and a higher high temperature exposure characteristic than those of the convention fluorescent display device.

For instance, by adding a compound containing P, K and/or Na in an amount of 0.005 to 10.00 wt % to a phosphor which was made by mixing a (Zn,Mg)O system phosphor with a $ZnGa_2O_4$ phosphor, a fluorescent display device emitting white light, which is free of cadmium and has a stable luminescence property and a long life span, could be obtained.

While the invention has been shown and described with respect to the preferred embodiments, it will be understood by those skilled in the art that various changes and modifications may be made without departing from the spirit and scope of the invention as defined in the following claims.

What is claimed is:

1. A fluorescent display device wherein light is emitted by impinging a low speed electron beam on a phosphor layer formed on an anode, wherein the phosphor layer comprises a compound selected from the group consisting of $K_3PO_4$, $NaPO_3$ and $Na_2SiO_3$, the compound being added in an amount of 0.01 to 10.00 wt % to the phosphor layer, and another compound containing W.

2. A phosphor paste comprising:
a phosphor containing at least one selected from the group consisting of a (Zn,Mg)O system phosphor, ZnO:Zn, $Ln_2O_2S$:Re (wherein Ln is La, Gd or Lu; and Re is Eu or Tb), $ZnGa_2O_4$ and $ZnGa_2O_4$:Mn; and
a compound containing at least one selected from the group consisting of $K_3PO_4$, $NaPO_3$ and $Na_2SiO_3$, wherein the compound is added in an amount of 0.01 to 10.00 wt % to the phosphor.

3. A phosphor paste comprising:
a phosphor containing at least one selected from the group consisting of a (Zn,Mg)O system phosphor, ZnO:Zn, $Ln_2O_2S$:Re (wherein Ln is La, Gd or Lu; and Re is Eu or Tb), $ZnGa_2O_4$ and $ZnGa_2O_4$:Mn;
a compound containing at least one selected from the group consisting of $K_3PO_4$, $NaPO_3$ and $Na_2SiO_3$, wherein the compound being added in an amount of 0.01 to 10.00 wt % to the phosphor; and
another compound containing W.

4. A phosphor paste comprising:
a phosphor;
a first compound containing at least one of P, K and Na; and
a second compound containing W, wherein the first compound is selected from the group consisting of $K_3PO_4$, $NaPO_3$ and $Na_2SiO_3$, the compound being added in an amount of 0.01 to 10.00 wt % to the phosphor.

* * * * *